US009578453B2

(12) United States Patent
Noble et al.

(10) Patent No.: US 9,578,453 B2
(45) Date of Patent: Feb. 21, 2017

(54) METHOD OF SENDING DESTINATION AND CURRENT LOCATIONS FROM A MOBILE DEVICE TO A CENTRAL VIEWING LOCATION

(71) Applicant: Garmin Switzerland GmbH, Schaffhausen (CH)

(72) Inventors: Charles Albert Noble, Yarmouth, ME (US); Adrian Chamberland Smith, Harpswell, ME (US)

(73) Assignee: Garmin Switzerland GmbH (CH)

( * ) Notice: Subject to any disclaimer, the term of this patent is extended or adjusted under 35 U.S.C. 154(b) by 0 days.

(21) Appl. No.: 14/621,486

(22) Filed: Feb. 13, 2015

(65) Prior Publication Data
US 2015/0237468 A1    Aug. 20, 2015

Related U.S. Application Data

(60) Provisional application No. 61/939,828, filed on Feb. 14, 2014.

(51) Int. Cl.
| | |
|---|---|
| *H04W 4/02* | (2009.01) |
| *G01S 19/13* | (2010.01) |
| *G01S 5/00* | (2006.01) |
| *G01C 21/36* | (2006.01) |
| *G08G 1/005* | (2006.01) |

(Continued)

(52) U.S. Cl.
CPC ............... *H04W 4/02* (2013.01); *G01C 21/36* (2013.01); *G01C 21/362* (2013.01); *G01S 5/0027* (2013.01); *G01S 19/13* (2013.01); *G08G 1/005* (2013.01); *G08G 1/0969* (2013.01); *G08G 1/096811* (2013.01); *G08G 1/096844* (2013.01); *G08G 1/096883* (2013.01)

(58) Field of Classification Search
CPC ......... H04W 4/02; G01S 5/0027; G01S 19/13; G01C 21/36; G01C 21/362; G08G 1/005; G08G 1/096811; G08G 1/096844; G08G 1/096883; G08G 1/0969
See application file for complete search history.

(56) References Cited

U.S. PATENT DOCUMENTS 5,842,146 A * 11/1998 Shishido ................ G01C 21/26
340/988
5,948,040 A * 9/1999 DeLorme ............... G01C 21/36
340/990

(Continued)

FOREIGN PATENT DOCUMENTS

EP        1229409 A2 *  7/2002   ............... G04G 7/02
WO    WO2014/016638 A1 *  1/2014   ............. H04B 7/185

*Primary Examiner* — Calvin Cheung
(74) *Attorney, Agent, or Firm* — Samuel M. Korte; Max M. Ali (57) ABSTRACT

A method of transmitting a destination along with the user's current location to a central viewing site allowing the user set or change their travel plan while they are on their trip and minimize bandwidth use on expensive or slow networks. A byproduct of this method is the transmission device can record the detailed path traveled by the user while transmitting enough user locations to give the viewer at the central viewing site a good indication of where the user has been. The detailed route traveled by the user is uploaded to the central viewing site when the transmission device is connected to a faster or less expensive network.

36 Claims, 10 Drawing Sheets

(51) Int. Cl.
*G08G 1/0968* (2006.01)
*G08G 1/0969* (2006.01)

(56) References Cited

U.S. PATENT DOCUMENTS

| | | | | |
|---|---|---|---|---|
| 5,995,041 A * | 11/1999 | Bradley | ............ | H04B 7/18571 |
| | | | | 342/357.75 |
| 6,321,158 B1 * | 11/2001 | DeLorme | ............... | G01C 21/26 |
| | | | | 340/995.16 |
| 6,675,011 B1 * | 1/2004 | Kita | ................... | H04B 7/18541 |
| | | | | 342/357.31 |
| 6,826,472 B1 * | 11/2004 | Kamei | ............... | G01C 21/3605 |
| | | | | 340/995.19 |
| 6,844,846 B1 * | 1/2005 | Riday | .................... | G01S 19/35 |
| | | | | 342/357.52 |
| 7,099,773 B2 * | 8/2006 | Linn | ....................... | G01C 21/28 |
| | | | | 701/411 |
| 7,383,123 B2 * | 6/2008 | Park | ....................... | G01C 21/36 |
| | | | | 701/410 |
| 8,244,454 B2 * | 8/2012 | Tertoolen | ........... | G01C 21/3682 |
| | | | | 701/436 |
| 8,363,065 B2 * | 1/2013 | Scott | ................... | G01C 21/367 |
| | | | | 345/440 |
| 8,515,666 B2 * | 8/2013 | Tysowski | ............... | G01C 21/00 |
| | | | | 340/539.11 |
| 9,264,856 B1 * | 2/2016 | Kotab | .................... | H04W 4/023 |
| 2001/0009406 A1 * | 7/2001 | Mise | .................... | G01S 5/0036 |
| | | | | 342/357.4 |
| 2002/0076962 A1 * | 6/2002 | Williams | ............. | H01R 13/627 |
| | | | | 439/188 |
| 2003/0187573 A1 * | 10/2003 | Agnew | .............. | G01C 21/3492 |
| | | | | 701/414 |
| 2005/0001743 A1 * | 1/2005 | Haemerle | ............. | G08G 1/0962 |
| | | | | 340/988 |
| 2005/0162312 A1 * | 7/2005 | Riday | ................... | G01S 5/0036 |
| | | | | 342/357.32 |
| 2005/0187961 A1 * | 8/2005 | Yokota | ................. | G06Q 10/109 |
| 2005/0255856 A1 * | 11/2005 | Griffin | .............. | H04W 36/0083 |
| | | | | 455/456.1 |
| 2005/0261822 A1 * | 11/2005 | Wako | .................... | G09B 29/007 |
| | | | | 701/438 |
| 2007/0106466 A1 * | 5/2007 | Noguchi | ............ | G01C 21/3614 |
| | | | | 701/418 |
| 2007/0118284 A1 * | 5/2007 | Sposato | ................. | G01C 21/20 |
| | | | | 701/469 |
| 2007/0135136 A1 * | 6/2007 | Ische | ......................... | G01S 5/02 |
| | | | | 455/456.1 |
| 2007/0260395 A1 * | 11/2007 | Matsuoka | .......... | G01C 21/3614 |
| | | | | 701/425 |
| 2008/0249708 A1 * | 10/2008 | Tran | ........................ | G01C 21/36 |
| | | | | 340/995.19 |
| 2010/0026526 A1 * | 2/2010 | Yokota | ............. | G08G 1/096827 |
| | | | | 340/996 |
| 2010/0332116 A1 * | 12/2010 | Sakashita | ................ | G01C 21/20 |
| | | | | 701/533 |
| 2012/0035843 A1 * | 2/2012 | Miura | .................. | G01C 21/3697 |
| | | | | 701/123 |
| 2013/0085630 A1 * | 4/2013 | Ninomiya | ............ | G01C 21/005 |
| | | | | 701/21 |
| 2013/0131986 A1 * | 5/2013 | Van Seggelen | .... | G01C 21/3484 |
| | | | | 701/533 |

\* cited by examiner

| Package Header | Device ID | Time Stamp | Current Location | Direction of Travel | Current Speed | Icon ID | Label | Destination Location |
|---|---|---|---|---|---|---|---|---|
| 700 | 701 | 702 | 703 | 704 | 705 | 706 | 707 | 708 |

Fig. 8

| Package Header | Device ID | Time Stamp | Current Location | Direction of Travel | Current Speed | Icon ID | Label | POI ID |
|---|---|---|---|---|---|---|---|---|
| 800 | 801 | 802 | 803 | 804 | 805 | 806 | 807 | 808 |

000000000# METHOD OF SENDING DESTINATION AND CURRENT LOCATIONS FROM A MOBILE DEVICE TO A CENTRAL VIEWING LOCATION

RELATED PUBLICATIONS

This application claims priority under 35 U.S.C. 119(e) to U.S. Provisional Application No. 61/939,828 entitled "METHOD OF SENDING DESTINATION AND CURRENT LOCATIONS FROM A MOBILE DEVICE TO A CENTRAL VIEWING LOCATION", filed on Feb. 14, 2014, the contents of which is incorporated by reference herein in its entirety.

FIELD OF THE INVENTION

The invention relates to the field of navigation, more particular to transmitting navigation updates to a central viewing location over a wide range of network systems minimizing the bandwidth used.

BACKGROUND OF THE INVENTION

Current navigation systems that display a user's trip on a central viewing location either build the trip on the central viewing location before the start of the trip or upload the trip after the event. Most users do not always know ahead of time what their destination is or are not inclined to take the time to plan ahead. They have no way to create or modify a trip during the event. The invention described within solves this problem along with minimizing the bandwidth on slow or expensive networking systems.

BRIEF SUMMARY OF INVENTION

The enclosed invention describes a method of sending the user's destination combined with the user's current location which reduces the bandwidth utilization and allows the user to change their destination on the fly. The invention also describes a method of storing and forwarding detailed locations to be used to fill in the user's trip route when a more convenient network system is available. Other aspects of the invention will become apparent by consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

DETAILED DESCRIPTION OF THE INVENTION

Figure 1:
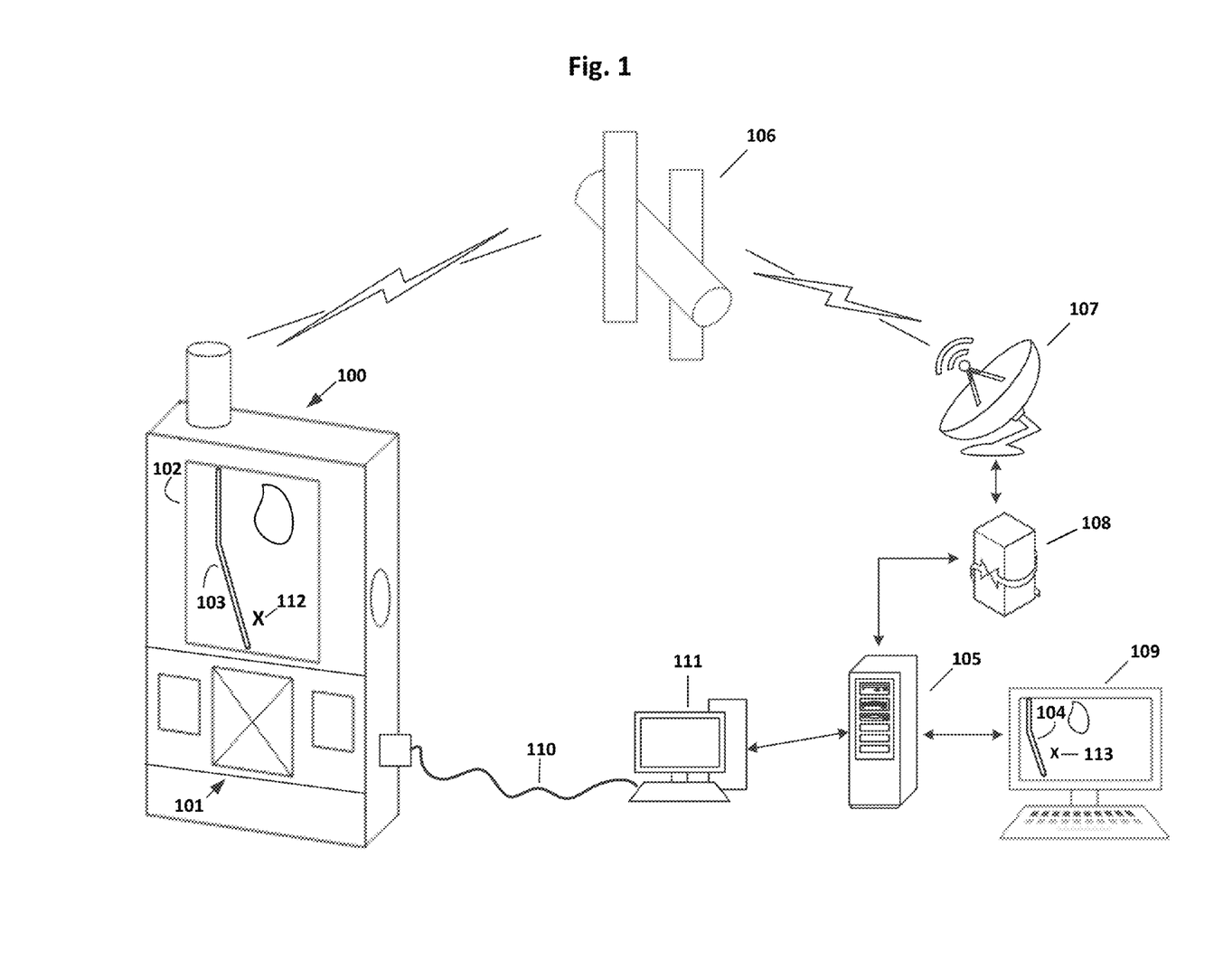
FIG. 1 is a system diagram of the preferred embodiment of the invention.

FIG. 1 depicts the overall system diagram of the preferred embodiment of the invention. A 2-way mobile communication device 100 is used to describe a user's trip by selecting a destination via the user input controls 101 from a list of destinations or by selecting a destination on the map viewed on the video display 102. The destination can be a specific latitude and longitude, a user Point of Interest (POI), or a multiple point route. In FIG. 1 the user has selected a route 103 as their destination and to be displayed on the web map 104.

The 2-way mobile communication device is also used to send the destination packages and other packages to the web server 105 via a network. In the preferred embodiment the network is a combination of a satellite 106 and land based components where the satellite is one satellite from a system of satellites that orbit the earth to give complete global coverage. Other network systems combinations can be used including but not limited to Bluetooth, cellular or Wi-Fi and land based systems.

The land based components consist of a ground station 107 which handles the communication between the satellite system and the gateway server 108. The gateway server deciphers the owner of the destination message and sends it off to the owner's web server 105 which interprets the message and decides how to display the message on the web map display 109.

The 2-way communication device can also allow the user to send or receive information stored on the device that might be too expensive or too large to transmit over a wireless connection. In the preferred embodiment of the invention this connection is done via a wired connection 110 to a computer 111. The user controls what data is transmitted over the less expensive connection.

Figure 2:
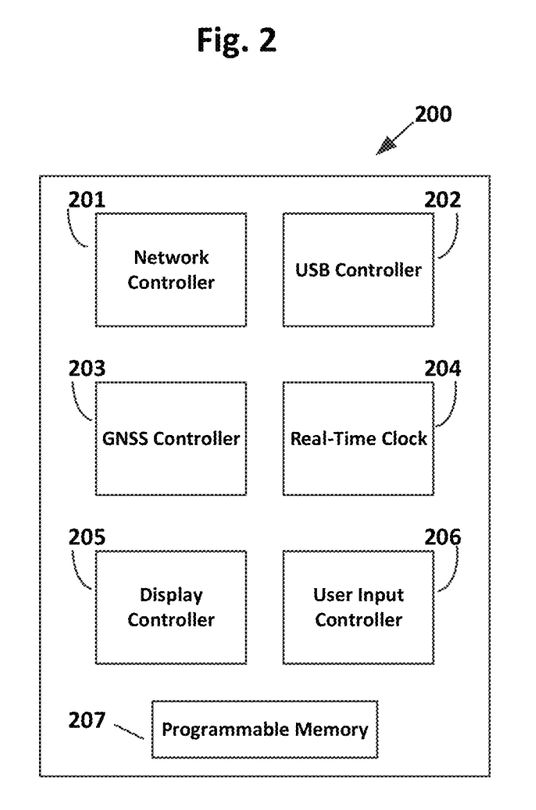
FIG. 2 is a block diagram of the modules on a typical 2-way communication device.

Unlike destination location packages where the user designates the destination location, the current location package is automatically generated by the Global Navigation Satellite System (GNSS) sensor 203 on the 2-way mobile communication device. Utilizing the real-time clock 204 the current location package is sent automatically at a set interval over the same network system used to transmit the user's trip destination location. The current location 112 and 113 can be displayed on the video display on the 2-way mobile communication device or on the web based map.

FIG. 2 is a block diagram 200 of the modules that are contained within the 2-way mobile communication device. The network controller 201 handles the communication between the device and the network. In the preferred embodiment this receiver is a satellite but could easily be a cell tower or a wireless router. The network controller can also use the USB controller 202 to transmit packages over a land line.

The GNSS 203 is used to receive transmissions from global positioning satellites which are used to compute the device's geographic location. The geographic location can be used to transmit information about the device with every package sent including the device's current position, text and SOS messages. The combination of the GNSS and real-time clock 204 can also be used to manage the power consumption of the device. One power saving example is to use the real-time clock to check at a set interval if the unit has moved. If the device has not moved then the current location message does not have to be transmitted.

The display controller 205 manages the graphical user interface and map display on the 2-way mobile communication device. The user can interact with the graphical user interface and map display with the use of the input controls serviced by the user input controller 206. In the preferred embodiment of the invention the input is a set of buttons that allow the user to scroll through a page of menus or select locations on a map. In other embodiments the input controls could be a keyboard or a touch screen.

The programmable memory 207, sometimes referenced as firmware, holds a set of instructions that controls the other device modules on the 2-way mobile communication device. This list of instructions can be updated as new features are created by the inventor. The flow diagram in FIG. 3 is a schematic of such a set of instructions to send destination and current location packages.

Figure 3:
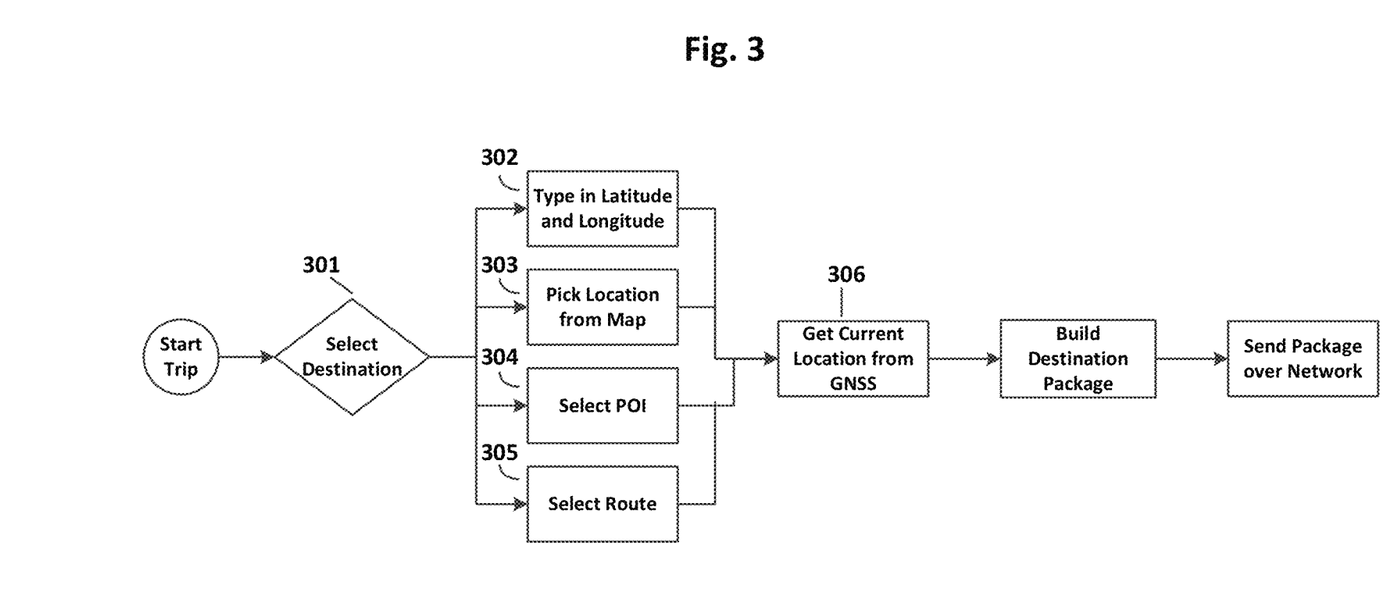
FIG. 3 is a flow chart of creating a destination package for transmission.

FIG. 3 is a flow chart depicting how a destination package is created for transmission over the network. In the preferred embodiment of the invention the user initiates the start of a new trip 300 on the 2-way communication device and has many options for selecting their destination 301. After the user selects their destination the user's current location is collected from the GNSS 306 and added to the specific Destination Package. By sending the user's current location along with the Destination Package the user can update their destination on the web server 105 while saving on bandwidth. The destination options described within are for the preferred embodiment of the invention.

Two options are similar; entering in a geographic grid location and selecting a location off the map. The former option is accomplished by typing in the geographic grid location 302. The latter option is accomplished by selecting a location off the map 303 by moving the map cursor with the user input controls 101 over the desired location on the map. The selected location on the map is converted to a geographic grid location. The geographic grid location can be but is not limited to latitude and longitude, UTM, State Plane or MGRS. In both destination options the geographic grid location is converted to a geographic grid location destination package as described in FIG. 7.

The user can also select their destination from a list of user points of interest (POI) 304. The POI list can include at least one but not limited to geographic features (lake, stream, mountain peak, etc), man-made features (museums, restaurants, trail signs, etc), and user created locations (waypoints). To aid in finding the desired destination in a large POI list the list can be sorted by category (lake, stream, mountain peak, museum, restaurants, etc. . . . ) or searchable (find Mt Washington). The selected POI is converted to a POI destination package as described in FIG. 8.

In another embodiment the geographic grid location can be computed based on a user entered street address. If the exact geographic location is known for that address that destination is used but if the address is not known simple interpolation algorithms can be used to compute an estimated destination location based on the address range of the street. In either case the geographic location of the street address is used to build a geographic grid location destination package.

This list can originate on the 2-way communication device or be created on another computer and transferred over to the 2-way communication device. If the list originates on the 2-way communication device that list has to be transferred over to the web server 105 before the POI destination package is sent or the selected POI has to be converted into a geographic grid location and a geographic grid location destination package is used instead.

Another destination option is to select a destination from a list of predetermined routes 305. A route contains two or more points and is sorted in the order of travel. The points can be made of but not limited to geographic grid locations or POIs. The route can originate on the 2-way communication device or be created on another computer and transferred over to the 2-way communication device. The selected route is converted into a route destination package as described in FIG. 9.

The list of predetermined routes can originate on the 2-way communication device or be created on another computer and transferred over to the 2-way communication device. If a predetermined route originates on the 2-way communication device that route has to be transferred over to the web server 105 before the route destination package is sent. The route transfer to the web server can be completed when the device connects to a less expensive network.

Figure 4:
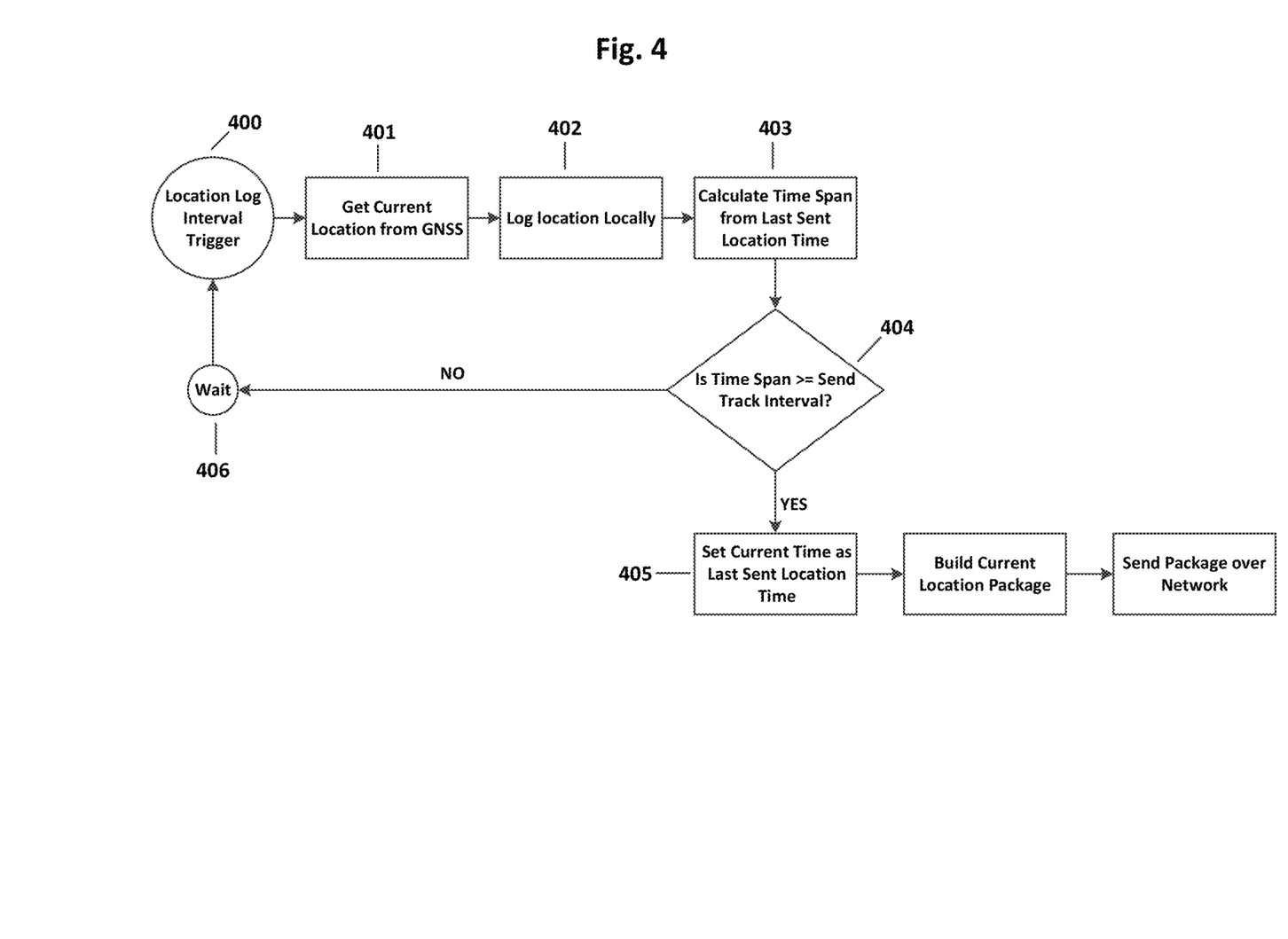
FIG. 4 is a flow chart of logging the device's current location and deciding if the location should be sent to the web server.

FIG. 4 flow chart depicts how to log locations for transmission at a later time and determine when to transmit the current location. The user configures how often the current location, called Location Log Interval, is saved into a file on the 2-way communication device. The Location Log Interval triggers 400 the 2-way communications device to get the current location 401 from the GNSS and store that location locally 402 on the device.

The user also configures how often the current location is transmitted called Send Track Interval. The very first logged location is transmitted and is recorded. Each subsequent logged location's time stamp is used to calculate the time span from the Last Sent Location time stamp 403. If the time span is greater than or equal to the configured Send Track Interval 404 the current time stamp is saved as the new Last Sent Location Time 405 and the current location is used to build the current location package, as described in FIG. 10, for transmission. If the time span is less than the configured Send Track Interval the 2-way communication device waits 406 for the next Location Log Interval trigger. Sending the user's current location less frequently reduces the cost of transmission while still giving the web server a representation of the path of travel. The device stores a more detailed path for downloading at a later date when a more cost effective method of transmission is available.

Figure 5:
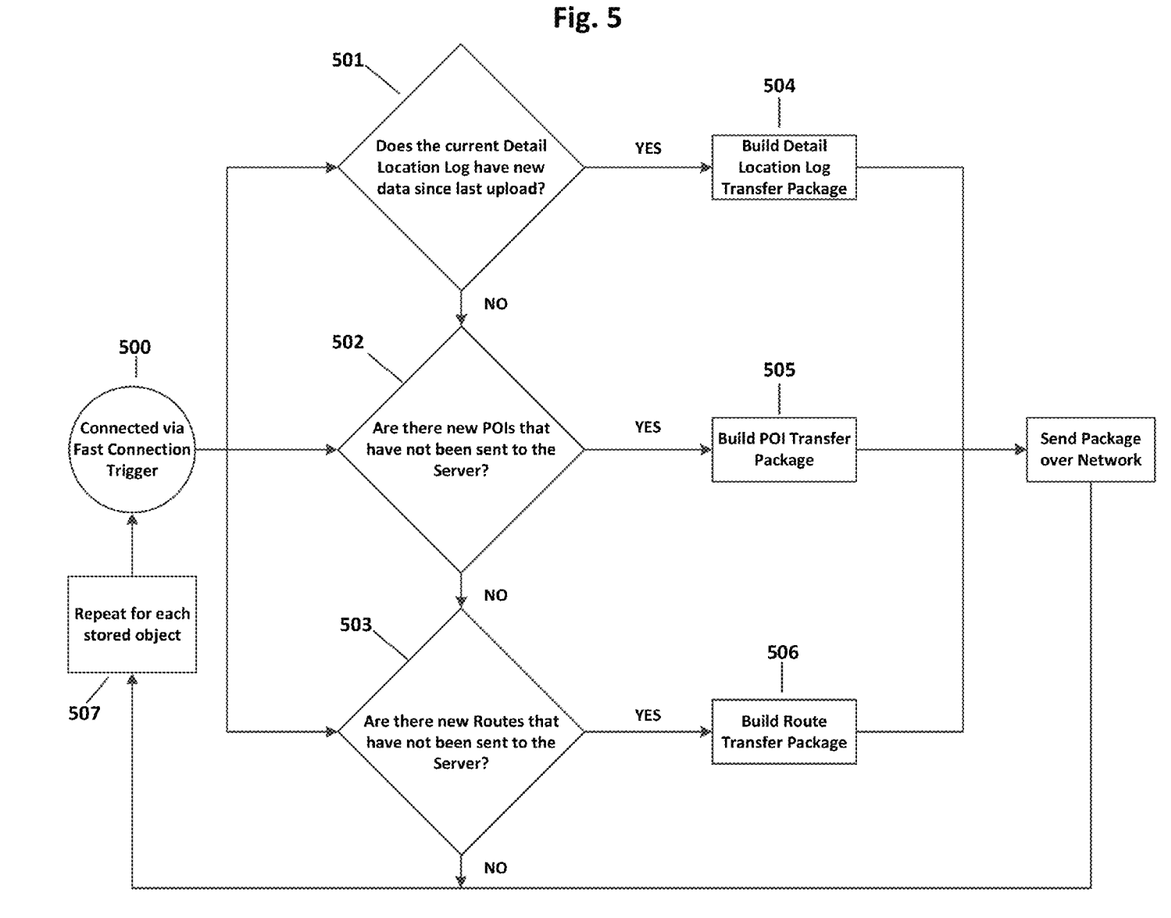
FIG. 5 is a flow chart describing when to send stored information on the device to the web server over a faster data connection.

FIG. 5 flow chart depicts the steps for downloading information stored on the 2-way communication device that has not been transmitted to the server. This information was either too large to send over a slow or expensive network connection or a connection was not available for a long period of time. As soon as the device detects that a connection was made to a fast network connection 500 the device checks to see if any new information is available to be transmitted to the Web Server. In the preferred embodiment of the invention this fast connection could be a connection to another computer over a USB cable or a wireless connection over Bluetooth to a smartphone. On other embodiments of the invention the connection could be over a Wi-Fi connection. The user has control over what is considered a fast network connection. This feature gives the user the ability to save money by utilizing a cheaper and sometimes a faster network to send large data packages.

In the preferred embodiment the 2-way communication device checks to see if it has an updated Detail Location Log 501, any updated POIs 502, or any updated Routes 503. If one is found a transfer package is built specific to the data type being transmitted 504, 505, or 506. The transfer package is then sent over to the server via the network connection. After sending the transfer package the device checks to see if there is other data to send 507. In another embodiment of the invention these steps can also be repeated on the Web Server to see if it has any updates for the device to receive. In that case any data available from the server is sent over the network to the device to update the device's information. In this embodiment both the device and the server can generate new data to be shared between the device and server.

Figure 6:
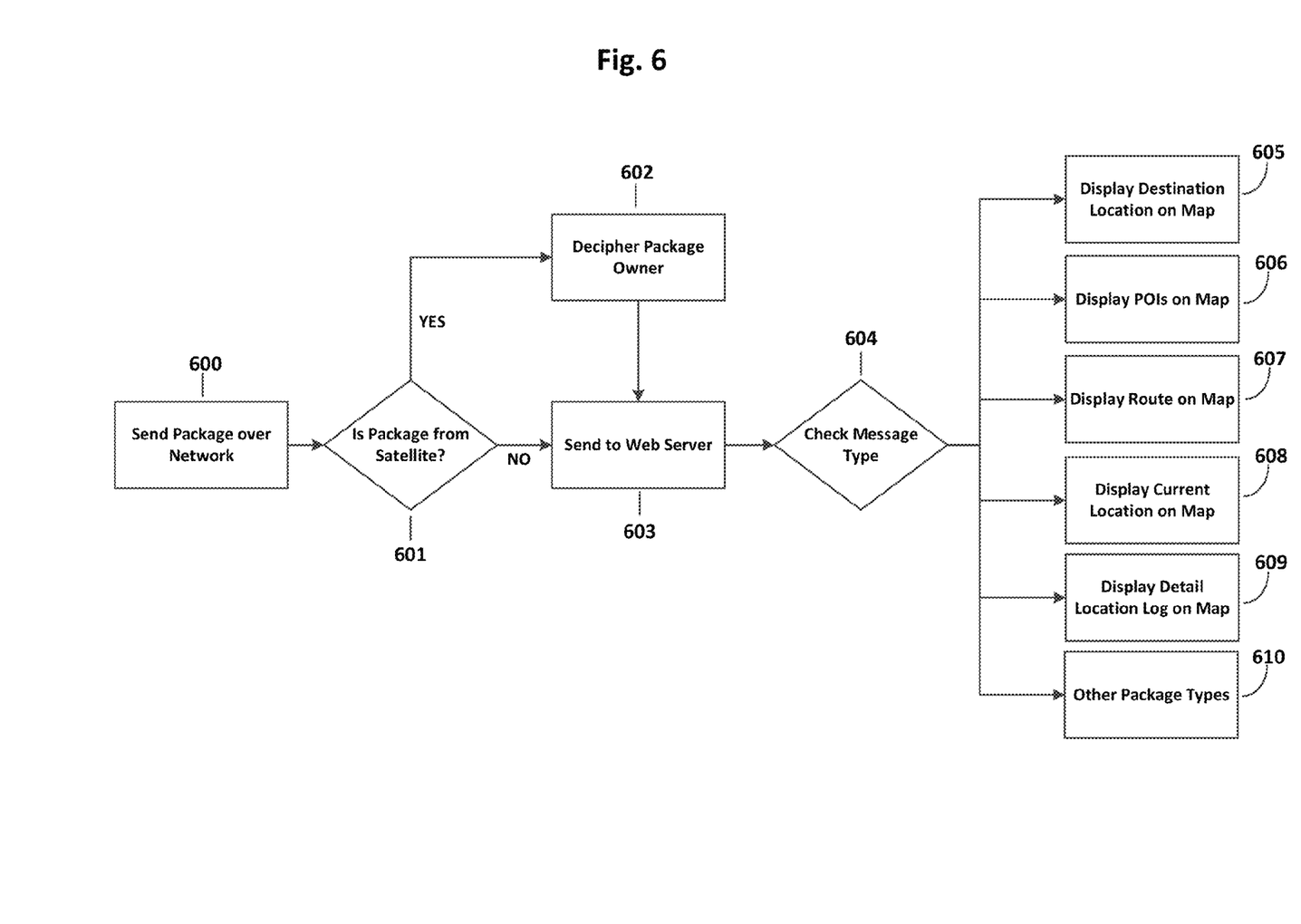
FIG. 6 is a flow chart of the web server receiving the transmission package and deciding how to display the information on the map.

FIG. 6 depicts the steps of sending the packages from the 2-way communication device to the Web Server. In the preferred embodiment of the invention this network 600 could be as described in FIG. 1 where the packages are sent over a satellite network 106 to a ground station 107 to a gateway server 108 over the Internet or a connection made via USB 110 to a computer and then to the Web Server over the Internet. In another embodiment the network connection could be via a Wi-Fi connection to a computer or a Bluetooth connection to a Smartphone where both are connected to the Web Server via the Internet.

If the package was sent over the satellite system 601 the owner's web site is found by looking at the owner of the package 602. Each package sent over satellite has an owner ID tagged to the package. This ID is used by the gateway 108 to resolve where to send the package 603. Most packages will be forwarded to the inventor's Web Server but some will be sent to Web Servers supported by $3^{rd}$ party providers. In either case the destination of the package will be a Web Server.

On the Web Server each package received will be checked 604 so that the web server can evaluate what to do with the package. In the preferred embodiment of the invention most packages update the map display. In other embodiments the packages could results in updating a travel log or just a simple web page describing where the user is and how far they are from the final destination. The following description describes the preferred embodiment of the interaction with an online map display at a central viewing location.

If the package is a Destination Package 605 the user's destination along with their current position oriented in the current direction of travel is displayed on the map. The user's estimated time of arrival is also available for the map viewer based on the user's current speed. The distance to the final destination is a straight line distance from the user's current location to the final destination. When the web server receives a Destination Package the web server considers the user to be in navigation mode and keeps the user in navigation mode until the user tells the server that they are leaving navigation mode by sending a special Stop Navigation package. If the server has not heard from the user in a predetermined amount of time the server assumes that the user has shut off their device or has lost power and the event has ended.

If the package is a POI Destination Package 606 the user's selected POI ID along with their current position oriented in the current direction of travel is displayed on the map. The POI ID is used to lookup the POI's geographic grid location. The POIs geographic grid location is used to display the POI on the map, to calculate the distance from the user's current location to the POI and to estimate the time of arrival to the POI. The distance to the final destination is a straight line distance from the user's current location and to the final destination. The user's estimated time of arrival is based on the user's current speed traveling in a straight line to the destination. When the web server receives a POI Destination Package the web server considers the user to be in navigation mode and will keep the user in navigation mode until the user tells the server that they are leaving navigation mode by sending a special Stop Navigation package. If the server has not heard from the user in a predetermined amount of time the server assumes that the user has shut off their device or has lost power and the event has ended.

If the package is a Route Destination Package 607 the user's selected Route ID along with their current position oriented in the current direction of travel is displayed on the map. The Route ID is used to lookup the list of geographic grid locations (called route points) that make up the route. The route points geographic grid locations are used to display the route on the map, to calculate the distances to route points from the user's current location and to estimate the time of arrival to route points. The distance to the next Route Point is a straight line distance from the user's current location to the next Route Point continuing to the final destination Route Point. The distance to the final Route Point is an accumulation of the straight line distance from the user's current location to the next Route Point and all subsequent straight line distances between Route Points. The user's estimated time of arrival to the next Route Point is based on the user's current speed traveling in a straight line to the next Route Point. The user's estimated time of arrival to the final Route Point is based on the user's current speed traveling over the calculated distance to the final Route Point. When the web server receives a Route Destination Package the web server considers the user to be in navigation mode and will keep the user in navigation mode until the user tells the server that they are leaving navigation mode by sending a special Stop Navigation package or if the server has not heard from the user in a predetermined amount of time the server assumes that the user has shut of their device or has lost power and the event has ended.

If the package is a Current Location Package 608 an arrow is displayed at that location oriented in the direction of travel. If the user was in navigation mode the distance to the destination and time of arrival is updated. If the user was not in navigation mode then just the user's location is displayed orientated in the direction of travel.

If the package is a Detailed Location Log 609 the detailed locations of travel stored on the device are added to the locations previously sent by the device to the web server. The line representing the path of travel by the user on the web page will be a better representation of the actual path of travel and will match the path of travel on the device. Each detailed location has an associated time stamp which is used to find a pair of locations on the web server that bracket the detailed location time stamp. For example if the detailed location time stamp falls between the $10^{th}$ and $11^{th}$ location points then that detailed location is inserted between the $10^{th}$ and $11^{th}$ location points. This process is repeated until all detailed locations are inserted.

All other non-navigational package types XXX are also handled by the web server appropriately. If the package includes a geographic location then that package will be displayed on the map. Packages without geographic locational information are stored on the web server and can be accessed by other means instead of a mapping interface such as a text message tread.

Figure 7:
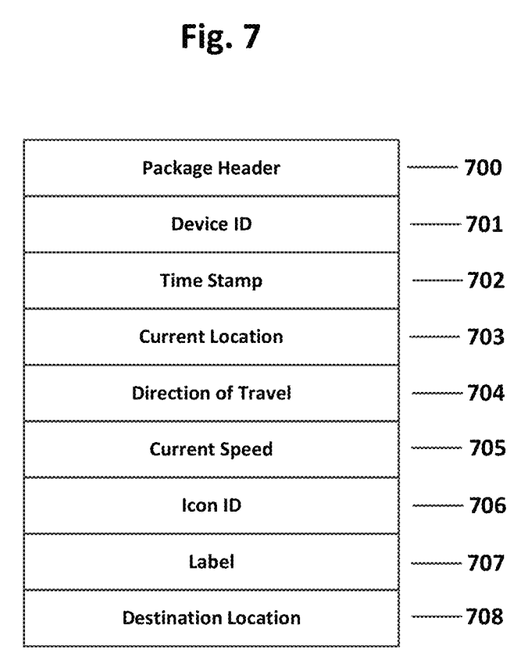
FIG. 7 is a diagram of a typical geographic grid location destination package.
Figure 8:
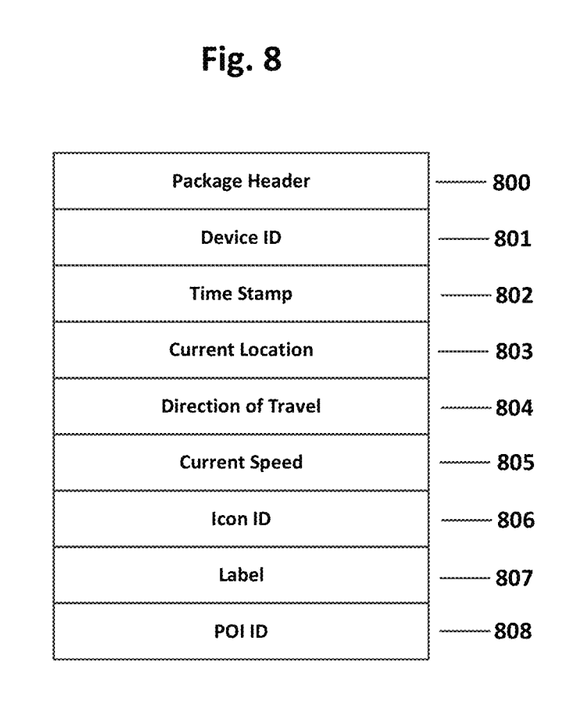
FIG. 8 is a diagram of a typical point of interest destination package.
Figure 9:
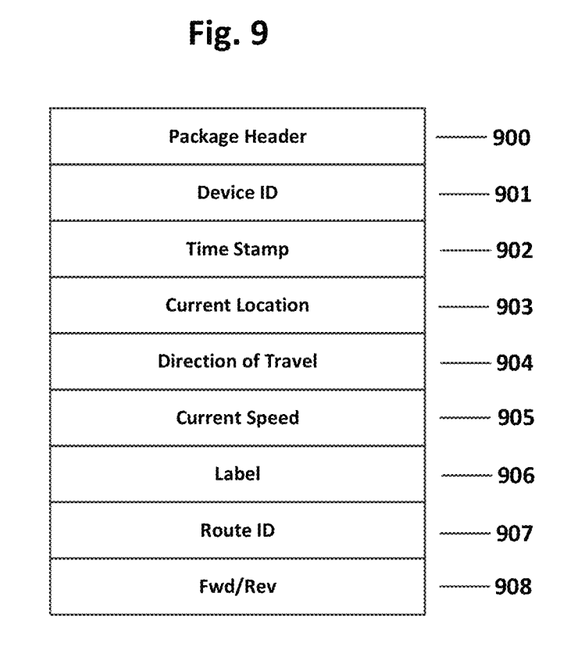
FIG. 9 is a diagram of a typical route destination package.
Figure 10:
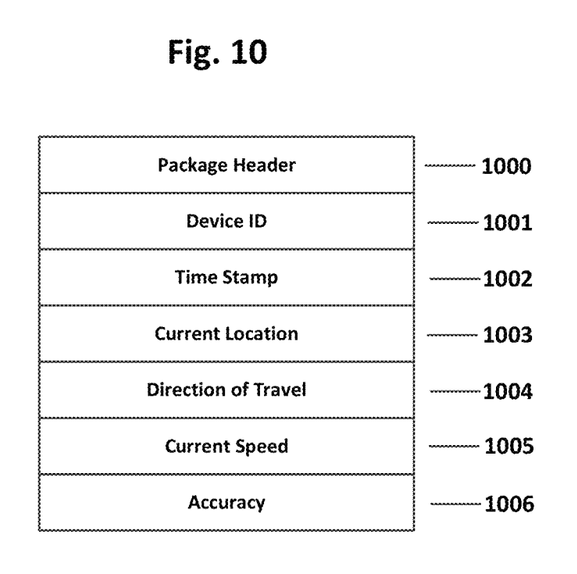
FIG. 10 is a diagram of a typical current location package.

FIGS. 7, 8, 9, 10 describe different types of data packages sent from the 2-way communications device to the web server. FIG. 7 describes the Geographic Grid Location Destination Package. FIG. 8 describes the POI Destination Package. FIG. 9 describes the Route Destination Package. FIG. 10 describes the Current Location Package. Each figure contains the minimum data structure for the preferred embodiment of the invention. In other embodiments more information can be added to the data packages for example the font attributes of the label. For clarity in describing the elements of each data structure common data elements are described once and referenced in each figure and data elements unique to a data structure are described and referenced separately.

The common elements are Package Header, Device ID, Time Stamp, Current Location, Direction of Travel, Current Speed, Icon ID, and Label. The Package Header 700, 800, 900, 1000 contains a code describing what type of data package is transmitted. Based on the Package Header the web server knows how to interpret the rest of the data package.

The Device ID 701, 801, 901, 1001 contains the unique identifier of the 2-way communication device. The web server can use this identifier to look up the owner of the device to get stored back office information (billing, message history, etc. . . . ) or distinguish the user's information on the map display from the another user's displayed packages.

The Time Stamp element 702, 802, 902, 1002 is the date and time the device's location was collected from the GNSS. The web server cannot assume that the order in which the packages were received is the order that they were created on the device. If there are times when the device is not able to send a package due to network availability the device queues the package for later transmission. When the network is available the device transmits the most recent packages and adds in the older data as it is received. The time stamp aids the web server in inserting the location in the correct position in the list of recorded data.

The Current Location 703, 803, 903, 1003 is the 2-way communication device's location collected from the GNSS at the time the package was created. In the preferred embodiment of the invention the current location is transmitted with every package. If the GNSS does not have a current fix the device will wait until a fix is available before creating a transmission package. The Direction of Travel 704, 804, 904, 1004 and the Current Speed 705, 805, 905, 1005 is also collected from the GNSS at the time the package was created.

Some of the packages can contain an Icon ID 706, 806. The Icon ID tells the web server which icon or symbol to use on the map display. If the icon does not exist or the package does not contain an Icon ID a default icon is used by the web server.

The Label 707, 807, 907 is also contained in some of the packages. The label is used to identify the package on the map display. The web server can decide if it is appropriate to display the label on the map, use the label to identify the package in list of similar packages or both. If the label does not exist the web server will use a default label for the package assuring that the label is unique.

The Destination Location 708 is unique to the Geographic Grid Location Destination Package. It is a geographic grid location for the destination and is displayed on the web map uniquely from other icons or symbols on the web map. The geographic grid location can be but is not limited to latitude and longitude, UTM, State Plane or MGRS.

The POI ID 808 is unique to the POI Destination Package and is used by the web server to locate the selected POI from its list of POIs. The POI contains the geographic grid location for that POI and the web server will display that POI on the web map. If the POI ID does not exist on the web server an error will be displayed on the portal. As soon as the new POI has been download from the 2-way communication device the POI will be added to the web map but cannot be used for navigation until that time.

The Route ID 907 is unique to the Route Destination Package and is used by the web server to locate the selected route from its list of routes. The selected route contains two or more geographic grid locations that make up a line representing the route and the web server will display that route line on the web map. If the Route ID does not exist on the web server an error will be displayed on the portal. As soon as the new route has been download from the 2-way communication device the route will be added to the web map but cannot be used for navigation on the web server until that time.

The Fwd/Rev element 908 is unique to the Route Destination Package and indicates which order the user is traveling along the selected route. If it is Fwd (forward) then the user is traveling from the first route point to the last route point. If it is Rev (reverse) then the user is traveling from the last route point to the first. This is useful when the web server is estimating the distance and time of arrival to route points.

The Accuracy element 1006 is unique to the Current Location Package and is the root-mean-square error, recorded as meters or feet, reported by the GNSS at the time the current location was collected. In the preferred embodiment of the invention the Accuracy element is not represented on the web map but available from the web server if requested.

The invention claimed is:

1. A two-way handheld satellite communications device for transmitting, the two-way communication device comprising:
   user input controls configured to receive an input;
   a device display;
   a Global Navigation Satellite System (GNSS) configured to determine a current geographic location of the two-way communications device;
   a memory configured to store the determined geographic location, a selected destination option, and a transmission interval;
   a network controller configured to wirelessly transmit data to a satellite network; and
   a controller coupled to the user input controls, the device display, the GNSS, the memory and the network controller, the controller configured to—
      determine the selected destination option based on the input received by the user input controls,
      create a transmission package including the determined geographic location and the selected destination option, and
      cause the network controller to transmit the transmission package to the satellite network upon expiration of the transmission interval.

2. The two-way handheld satellite communications device as recited in claim 1, wherein the controller is further configured to include text or a SOS message in the transmission package.

3. The two-way handheld satellite communications device as recited in claim 1, wherein the controller is a display controller.

4. The two-way handheld satellite communications device as recited in claim 1, further comprising a real-time clock, wherein the real-time clock is used by the GNSS to determine the current geographic location and store the determined geographic location in the memory.

5. The two-way handheld satellite communications device as recited in claim 4, wherein the network controller transmits the transmission package less frequently than the rate at which the determined geographic location is stored in the memory.

6. The two-way handheld satellite communications device as recited in claim 1, wherein the memory is further configured to store a set of instructions that control one or more modules in the two-way communications device.

7. The two-way handheld satellite communications device as recited in claim 1, wherein the controller is further configured to present at least one destination option for selection on the device display.

8. The two-way handheld satellite communications device as recited in claim 7, wherein the controller is further configured to present a plurality of options for selecting a destination option.

9. The two-way handheld satellite communications device as recited in claim 1, wherein the selected destination option is a geographic grid location.

10. The two-way handheld satellite communications device as recited in claim 9, wherein the controller is further configured to determine a current geographic grid location associated with the determined geographic location, a current direction of travel, and a current speed based on the determined geographic location.

11. The two-way handheld satellite communications device as recited in claim 10, wherein the transmission package comprises a package header, a device id, a time stamp, device's current geographic grid location, device's current direction of travel, device's current speed, an icon id, and a label.

12. The two-way handheld satellite communications device as recited in claim 1, wherein the selected destination option is a point of interest linked to a geographic grid location.

13. The two-way handheld satellite communications device as recited in claim 1, wherein the selected destination option is a route formed by an ordered list of geographic grid locations.

14. The two-way handheld satellite communications device as recited in claim 1, wherein the selected destination option is a point of interest destination.

15. The two-way handheld satellite communications device as recited in claim 14, wherein the transmission package comprises a package header, a device id, a time stamp, device's current geographic grid location, device's current direction of travel, device's current speed, an point of interest id, an icon id, and a label.

16. The two-way handheld satellite communications device as recited in claim 1, wherein the selected destination option is a route destination.

17. The two-way handheld satellite communications device as recited in claim 16, wherein the transmission package comprises a package header, a device id, a time stamp, device's current geographic grid location, device's current direction of travel, device's current speed, a route id, a direction of travel along the route, and a label.

18. A two-way handheld satellite communications device, comprising:
user input controls configured to receive an input;
a device display;
a Global Navigation Satellite System (GNSS) configured to determine a current geographic location of the two-way communications device;
a memory configured to store the determined geographic location, a selected destination option, and a transmission interval;
a network controller configured to wirelessly transmit data to a satellite network; and
a controller coupled to the user input controls, the device display, the GNSS, the memory and the network controller, the controller configured to—
present at least one destination option for selection on the device display,
determine the selected destination option based on the input received by the user input controls,
create a transmission package including the determined geographic location and the selected destination option, and
cause the network controller to transmit the transmission package to the satellite network upon expiration of the transmission interval.

19. The two-way handheld satellite communications device as recited in claim 1, wherein the controller is further configured to include a direction of travel in the transmission package.

20. The two-way handheld satellite communications device as recited in claim 18, wherein the controller is further configured to include text or a SOS message in the transmission package.

21. The two-way handheld satellite communications device as recited in claim 18, wherein the controller is a display controller.

22. The two-way handheld satellite communications device as recited in claim 18, further comprising a real-time clock, wherein the real-time clock is used by the GNSS to determine the current geographic location and store the determined geographic location in the memory.

23. The two-way handheld satellite communications device as recited in claim 22, wherein the network controller transmits the transmission package less frequently than the rate at which the determined geographic location is stored in the memory.

24. The two-way handheld satellite communications device as recited in claim 18, wherein the memory is further configured to store a set of instructions that control one or more modules in the two-way communications device.

25. The two-way handheld satellite communications device as recited in claim 18, wherein the controller is further configured to present at least one destination option for selection on the device display.

26. The two-way handheld satellite communications device as recited in claim 25, wherein the controller is further configured to present a plurality of options for selecting a destination option.

27. The two-way handheld satellite communications device as recited in claim 18, wherein the selected destination option is a geographic grid location.

28. The two-way handheld satellite communications device as recited in claim 27, wherein the controller is further configured to determine a current geographic grid location associated with the determined geographic location, a current direction of travel, and a current speed based on the determined geographic location.

29. The two-way handheld satellite communications device as recited in claim 28, wherein the transmission package comprises a package header, a device id, a time stamp, device's current geographic grid location, device's current direction of travel, device's current speed, an icon id, and a label.

30. The two-way handheld satellite communications device as recited in claim 18, wherein the selected destination option is a point of interest linked to a geographic grid location.

31. The two-way handheld satellite communications device as recited in claim 18, wherein the selected destination option is a route formed by an ordered list of geographic grid locations.

32. The two-way handheld satellite communications device as recited in claim 18, wherein the selected destination option is a point of interest destination.

33. The two-way handheld satellite communications device as recited in claim 32, wherein the transmission package comprises a package header, a device id, a time stamp, device's current geographic grid location, device's current direction of travel, device's current speed, an point of interest id, an icon id, and a label.

34. The two-way handheld satellite communications device as recited in claim 18, wherein the selected destination option is a route destination.

35. The two-way handheld satellite communications device as recited in claim 34, wherein the transmission package comprises a package header, a device id, a time stamp, device's current geographic grid location, device's current direction of travel, device's current speed, a route id, a direction of travel along the route, and a label.

36. The two-way handheld satellite communications device as recited in claim 18, wherein the controller is further configured to include a direction of travel in the transmission package.

* * * * *